United States Patent
Kwack (10) Patent No.: US 8,313,564 B2
(45) Date of Patent: Nov. 20, 2012

(54) METHOD FOR FILTRATING GASES

(76) Inventor: Sam Yung Kwack, Bishopville, MD (US)

( * ) Notice: Subject to any disclaimer, the term of this patent is extended or adjusted under 35 U.S.C. 154(b) by 0 days.

(21) Appl. No.: 13/473,186

(22) Filed: May 16, 2012

(65) Prior Publication Data

US 2012/0240766 A1    Sep. 27, 2012

Related U.S. Application Data

(62) Division of application No. 12/489,855, filed on Jun. 23, 2009, now Pat. No. 8,206,495.

(51) Int. Cl.
*B01D 47/02*    (2006.01)

(52) U.S. Cl. ............... 95/223; 95/226; 96/278; 96/279; 96/351; 96/352; 96/353

(58) Field of Classification Search .......... None
See application file for complete search history.

(56) References Cited

U.S. PATENT DOCUMENTS

| | | | | |
|---|---|---|---|---|
| 2,405,494 A * | 8/1946 | Dupuy | ............ | 96/340 |
| 3,316,693 A * | 5/1967 | Fermor | ............ | 96/350 |
| 3,791,104 A * | 2/1974 | Clitheroe | ............ | 95/151 |
| 3,922,152 A * | 11/1975 | Kookoothakis | ............ | 96/331 |
| 3,957,467 A * | 5/1976 | Kim | ............ | 96/353 |
| 4,193,774 A * | 3/1980 | Pilat | ............ | 95/71 |
| 4,229,417 A * | 10/1980 | Kanai et al. | ............ | 422/176 |
| 4,239,515 A * | 12/1980 | Yanagioka et al. | ............ | 96/272 |
| 4,251,485 A * | 2/1981 | Schauer et al. | ............ | 422/168 |
| 4,251,486 A * | 2/1981 | Sohda | ............ | 422/170 |
| 4,540,162 A * | 9/1985 | Gozlan | ............ | 266/146 |
| 4,624,791 A * | 11/1986 | Ferriss | ............ | 210/704 |
| 4,880,606 A * | 11/1989 | Gorlich | ............ | 423/220 |
| 4,936,878 A * | 6/1990 | Gustavsson et al. | ............ | 95/216 |
| 5,053,061 A * | 10/1991 | Tatani et al. | ............ | 95/211 |
| 5,067,974 A * | 11/1991 | Chang | ............ | 261/124 |
| 5,078,759 A * | 1/1992 | Kira | ............ | 95/223 |
| 5,403,567 A * | 4/1995 | Smith et al. | ............ | 423/210 |
| 5,453,107 A * | 9/1995 | Liu | ............ | 96/344 |
| 5,858,072 A * | 1/1999 | Motoda | ............ | 96/332 |
| 5,928,615 A * | 7/1999 | Strock et al. | ............ | 422/231 |
| 2003/0001295 A1* | 1/2003 | Okajima et al. | ............ | 261/124 |
| 2005/0022668 A1* | 2/2005 | Cairns | ............ | 95/226 |

FOREIGN PATENT DOCUMENTS

KR    1988-0000961    3/1988

OTHER PUBLICATIONS

Korean Office Action for 10-2010-0103215 dated Apr. 30, 2012.

* cited by examiner

*Primary Examiner* — Duane Smith
*Assistant Examiner* — Pankti Patel
(74) *Attorney, Agent, or Firm* — Lowe Hauptman Ham & Berner, LLP (57) ABSTRACT

A gas filtration system includes a liquid filtering system and a gas transferring system. The liquid filtering system has multiple tanks connected to each which contains a gas scrubbing liquid through which the gas is bubbled. The gas transferring system includes pipes coupled with the tanks for transferring gases. The tanks include a dry tank that is used for storing one or more of pumps, filters and a gas flow buffer.

12 Claims, 5 Drawing Sheets

METHOD FOR FILTRATING GASES

CROSS-REFERENCE TO RELATED APPLICATIONS

The present application is a Divisional Application of U.S. patent application Ser. No. 12/489,855, filed Jun. 23, 2009 now U.S. Pat. No. 8,206,495, which is incorporated herein by reference in its entirety.

TECHNICAL FIELD

This present application relates to gas filtration system, and more particularly, a gas filtration system including a combination of tanks containing different amounts of water for scrubbing noxious gases emitted from equipment which burn fossil/fuel, such as, incinerators, oil refineries, rubber factories, plastic factories, large container boats, energy plants, etc.

BACKGROUND

Due to the rapid development of economies and industries all over the world, greenhouse/noxious gases/particulate matter have been increasingly released into the environment. Common greenhouse/noxious gases in the Earth's atmosphere include carbon dioxide, sulphur dioxide, methane, nitrous oxide, ozone, and chlorofluorocarbons. The emissions of these noxious gases bring many issues, such as acid rain and/or the greenhouse effect which is one of several factors that affect the temperature of the Earth and cause global warming. As a result of the air pollution, there has been a significant effort made to reduce the gas contamination in these gaseous emissions.

Over the years, a number of devices have been developed for filtrating gases, for example, scrubbing exhaust gases. However, most devices have complicated structures thereby increasing costs of the devices. Further, the methods for scrubbing gases in the art are some instances require a complex process to achieve desired efficiency. Some examples of conventional apparatus for scrubbing gases are exemplified as follows.

One apparatus for scrubbing either acidic or alkaline impurities from gas streams is disclosed in Thomas. (U.S. Pat. No. 6,893,484). Specifically, as seen in Figures of Thomas, gas is introduced into a container and passes through a plurality of tubes that are located in a lower portion of the container. The gas is then released from holes of the tubes into a sealed space containing liquid absorbent substance. Finally, the cleansed gas passes through a metal mesh and is released out of the container.

Another method for scrubbing gases is disclosed in Trivett. (U.S. Pat. No. 7,056,367). Trivett discloses a method for scrubbing gases, i.e., the gases are pushed into a liquid tank and flow through scrubbing liquid. The gases then flow in a reverse direction through mixing vanes thereby creating tiny bubbles to enhance the interaction of the gaseous pollutants with the scrubbing liquid.

Further, as disclosed in Lube (U.S. Pat. No. 4,212,656), a smoke scrubbing system involves spraying water to promote cleaning of the smoke. In this arrangement, the smoke passes through several chambers to fully contact the water spray. The scrubbed smoke is then released out from the containers. In order to achieve the maximum efficiency, Lube provides several nozzles such has a fan spray type to cause the water to effectively contact the smoke. This arrangement inevitably increases the cost of producing such a smoke scrubbing system and it is likely to be difficult to repair/maintain the nozzles which are disposed inside of the each container.

Many more examples of developments in the art are directed to similar subject matter.

SUMMARY

In one or more embodiments, a gas filtration system includes a liquid filtering system and a gas transferring system. The liquid filtering system has multiple tanks connected to each other for containing liquid. The gas transferring system including pipes is coupled with the tanks for transferring gases. The tanks of the liquid filtering system include at least one tank that is free of liquid. This tank, namely a dry tank, can be used for dry filtration, or in some instances, to contain pumps for forcing gases to flow in the gas filtration system.

Another embodiment features a combination of tanks containing different amounts of water for filtrating/purifying gases. This is an important feature of the present invention.

DETAILED DESCRIPTION

Figure 1:
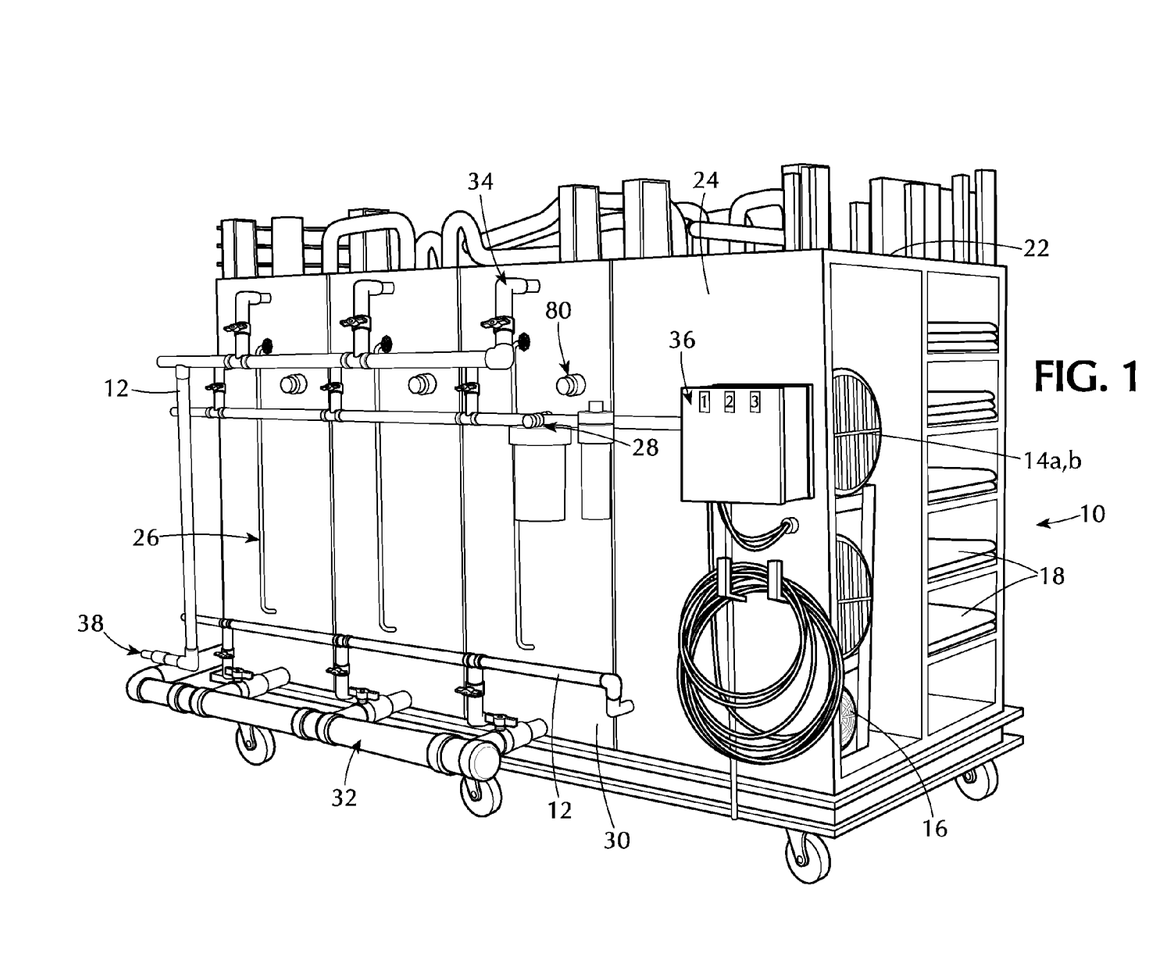
FIG. 1 is a perspective view showing an outer frame of one or more embodiments of a gas filtration system.

FIG. 1 is a perspective view of an outer frame of one or more embodiments of a gas filtration system. The gas filtration system 10 includes a plurality of tanks 30. In at at least one embodiment one tank is not used for liquid filtration and includes a plurality of layer filters used for dry gas filtration. In the embodiments, the desired liquid contained in the tanks 30 is water. It should, however, be noted that liquid used in the gas filtration system 10 is not limited to water. Any other component which can achieve the same function can be used in the gas filtration system 10.

In some embodiments, the final stage of the filtration process is such that the scrubbed/wet filtered gas is passed through layers of dry filters which comprise a micro particle filter containing activated carbon/charcoal. As illustrated in FIG. 1, the filters are provided in a tank so as to provide several layers of gas filtration.

Each of the tanks 30 is formed substantially in a rectangular or cubic solid shape. A number of the tanks are assembled together and define front surfaces 24 and top surfaces 22. In a particular embodiment as illustrated in FIG. 1, eight tanks are arranged in two lines and adjacent to each other. Also, according to the particular embodiment shown in FIG. 1, each of the tanks 30 for containing liquid has a transparent strip 26 on front surfaces 24 of the tanks 30 for observing liquid level in each tank 30 and indicating a proper timing to add liquid. A device 28 for filter/liquid capture observation is positioned outside the tanks 30, generally positioned on the front surface 24 of a tank 30. A body of the device 28 can be made of, but not limited to, transparent plastic, so as to allow the users to observe the color change in the liquid so as to determine the timing with which changing the used liquid in the tanks is necessary.

In order to transfer the gases into the respective tanks, several pumps, e.g., gas pumps 14a, 14b and liquid pump 16 are provided and positioned in this embodiment, in one or more tanks which are not used for gas filtration per se. Also regarding the embodiment shown in FIG. 1, the gas pumps 14a, 14b and water pump 16 is desired to be located in the same tank for saving space. A control box 36 for controlling the pumps 14a, 14b and 16 is provided on the front wall of one of the tanks.

A plurality of liquid transferring pipes 12 are connected to each tank which is adapted to contain liquid. The liquid transferring pipes 12 have multiple segments defining liquid inlets 34 and liquid outlets 32 for each tank 30. For example, liquid used for the gas filtration system 10 is imported from a liquid source inlet 38 and transferred by the liquid transferring pipes 12 to each tank 30 via the liquid inlets 34. In the particular embodiment of FIG. 1, the liquid inlets 34 are arranged to connect the respective tank 30 at an upper portion of the front surface 24. Liquid used for the gas filtration system 10 is outputted from liquid outlets 32 when the gas filtration process is finished. The liquid outlets 32 are adapted to release used liquid from the tanks. The liquid source inlet 38 is coupled with the liquid transferring pipes 12. The liquid outlets 32 are provided to each of the respective tank 30 which is used for containing liquid, so that the used liquid can be separately released from the respective tank 30. The liquid pump 16 e.g., located in the tank 30 for forcing liquid from the liquid source inlet 38 to the tanks.

After using the gas filtration system for a while, contaminates remain in the tanks 30. In order to clean out these contaminates, hoses can be used to connect to a hose plug 80 formed at the front surface 24 of each tank 30.

In operation of the liquid transferring system, liquid used in the gas filtration system, for example, water, for filtration is transferred from the water source inlet 38 along the liquid transferring pipes 12 to the tanks 30 by means of the water pump 16. The gas is forced by means of the gas pump 14a, 14b.

Figure 2:
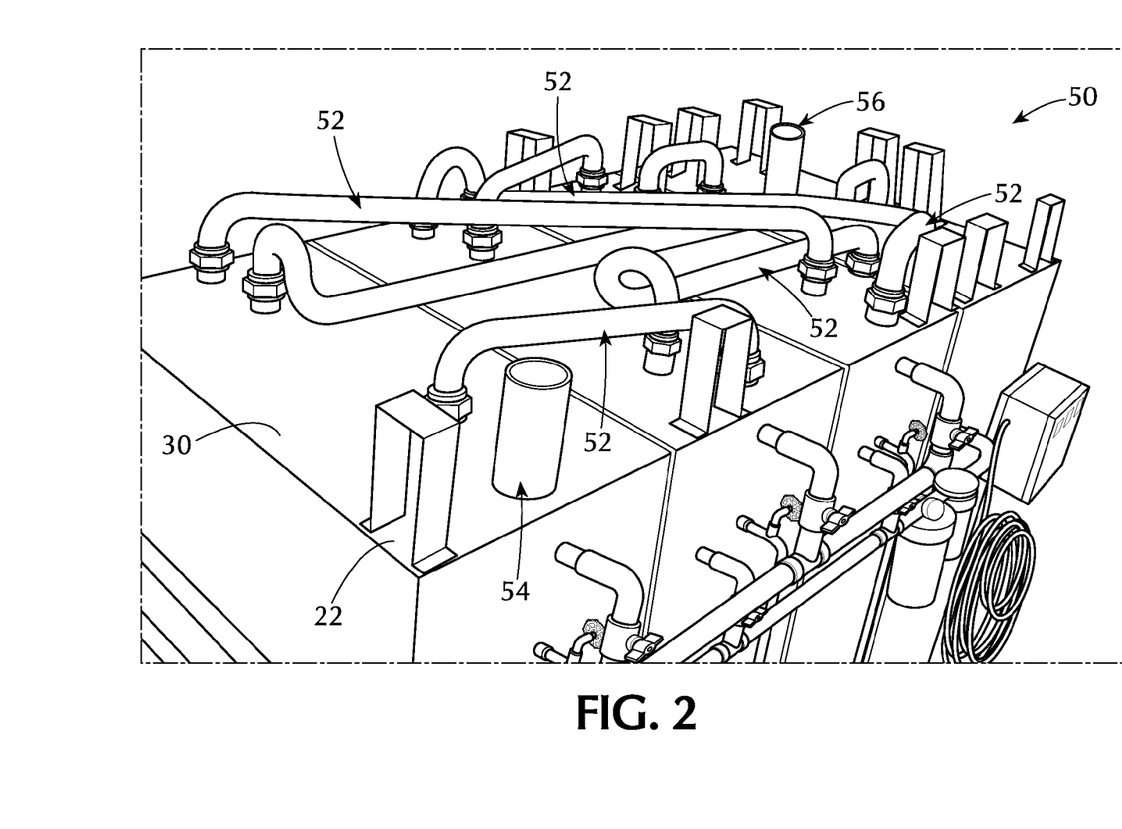
FIG. 2 is a perspective view showing a gas transferring system of one or more embodiments of the gas filtration system.

FIG. 2 is a perspective view showing an embodiment of a gas transferring system 50 of the gas filtration system 10. The several tanks 30 are also connected by gas transferring system 50 which includes a plurality of gas transferring pipes 52. According to the embodiment of FIG. 2, the gas transferring system 50 includes a gas transferring pipe 52a, 52b, . . . 52i, (in FIG. 3) for transferring the gases from one tank to another. The material of the gas transferring pipes in a desired embodiment is stainless steel. In some embodiments, each gas transferring pipe 52 is mounted in the tanks 30 and protruded from the top surface 22 of the tanks 30. The location of the gas transferring pipe to protrude is not necessary to be from the top surface 22, but generally should be as close to the top surface of the tanks being efficiency to release the gases out as much as possible in a short time. The entire gas filtration process lasts approximately 10 second.

Figure 3:
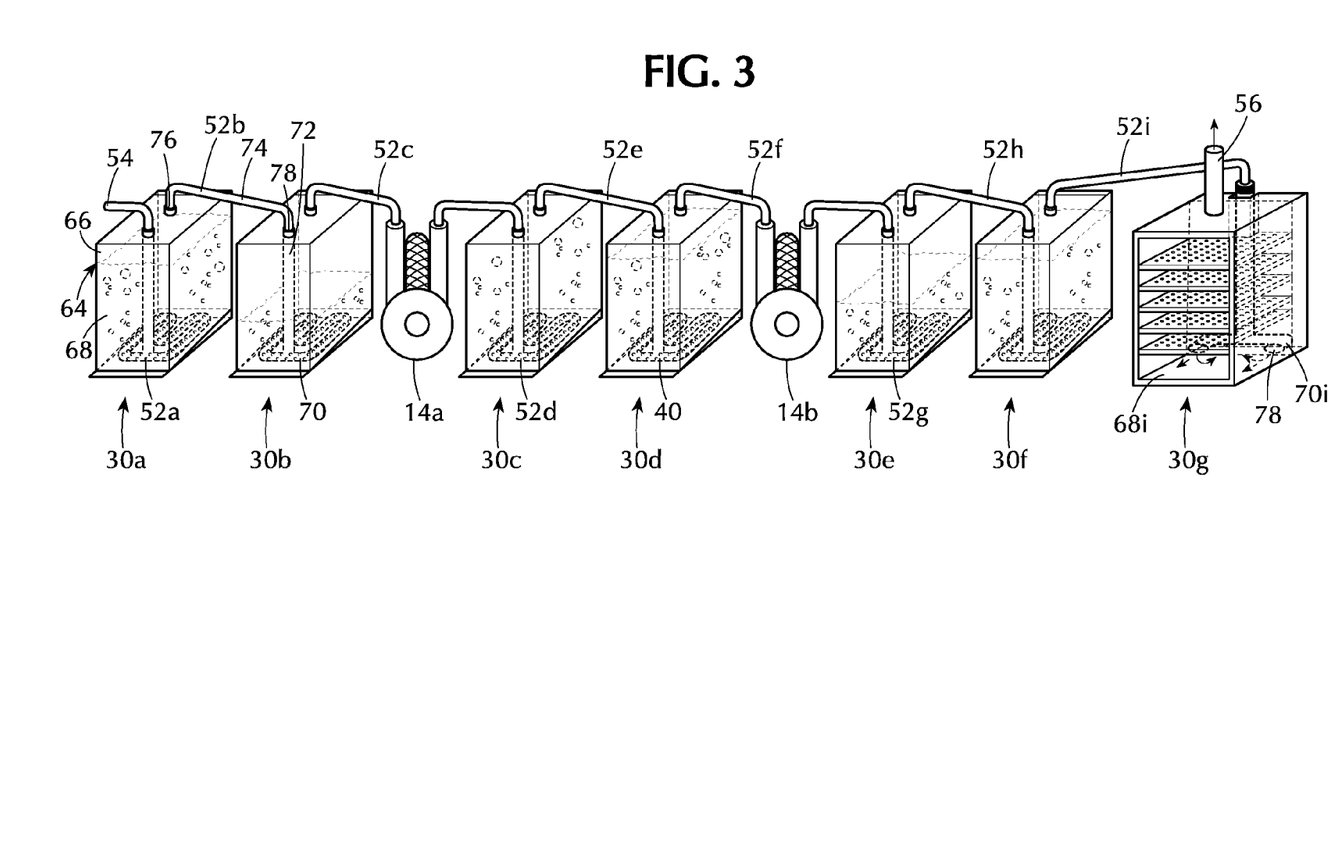
FIG. 3 is an exploded schematically perspective view showing an inner frame of one or more embodiments of the gas filtration system.

The detailed structure of the gas transferring pipes 52 will be illustrated hereafter according to FIG. 3 illustrating a gas capture process in tanks 30. On the top surface 22 of the tanks 30, a gas inlet 54 is connected to one of the tank 30 for importing gases into the tanks 30 for filtration. Further, a gas outlet 56 is mounted on the top surface 22 of a tank 30 for releasing gas which is already cleansed by the gas filtration system 10. In some embodiments, the gas outlet 56 is desired to be mounted to the top surface 22 of the respective tank 30 which contains layer filters for last step of the gas filtration process. (The gas filtration process will be illustrated hereafter with reference to FIG. 3).

FIG. 3 is an exploded schematic perspective view showing an inner frame of one or more embodiments of the gas filtration system 10. The tanks 30 including tanks 30a, 30b, . . . 30g, are connected together by the gas transferring system 50, e.g., the plurality of the gas transferring pipes 52a, 52b, . . . 52i. The gas filtration system 10 includes some tanks for liquid filtering and at least one tank for layer filtering. In particular, as shown in FIG. 3, the tanks 30a, 30b, 30d, 30e, 30f contain a predetermined amount of liquid for filtrating/purifying gas. The tank 30g is connected to the tank 30f and contains a plurality of layer filters 18 (shown also in FIG. 5).

More specifically, the tanks 30a, 30b, . . . 30h of the gas filtration system 10 are positioned adjacent to each other and assembled together. In the particular embodiment as shown in FIG. 3, each tank 30a, 30b, . . . 30h has a dimension of 24"24"60". It should be noted that the size of the tanks 30 is not limited to that shown in FIG. 3.

The amount of liquid contained in each tank 30a, 30b, . . . 30f is predetermined based on the power of the gas pumps 14a, 14b. Each tank 30a, 30b, . . . 30f has a liquid level associated with its amount of liquid. It should be noted that, a height of the liquid level is also not limited to the illustrated embodiment, and liquid levels can be adjusted according to the amounts of liquid. As a particular embodiment illustrated in FIGS. 1-3, the power of each air pump motor is 230v, 4 hp, 3451 rpm, 18 amps.

In order to achieve the desired efficiency, the liquid levels, i.e., the amount of liquid, in the tanks 30a, 30b, . . . 30f are, by way of the practical example as follows.

The first tank 30a contains amount of liquid that is 36" high (89.9 gallons).

The second tank 30b contains liquid that is 16" high (39.9 gallons).

The third tank 30c contains no liquid for gas filtration.

The fourth tank 30d contains liquid that is 39" high (97.2 gallons).

The fifth tank 30e contains liquid that is 24" high (59.8 gallons).

The sixth tank 30f contains liquid that is 39" high (97.2 gallons).

The liquid level defines a liquid surface to divide the entire liquid tank into two spaces, an upper space without liquid and a lower space with liquid. In the particular embodiment as shown in FIG. 3, for example, in the tank 30a, a liquid surface 64 divides the tank 30a into an upper space 66 without liquid and a lower space 68 with liquid.

FIG. 3 also illustrates that the tanks 30 are connected to each other via the gas transferring pipes 52 or the gas pumps 14a, 14b. Due to the connection manner of the tanks 30, the gas transferring pipes have two types. More specifically, the gas transferring pipes 52a, 52b, 52d, 52e, 52g, 52h are the first type gas transferring pipes I which are mounted on the top surfaces 22 of the tanks 30 and connected to the respective tank, for example tank 30a, 30b, 30c, 30d, 30e, 30f, 30g, for transferring the gas into the respective tank. The gas transferring pipes 52c, 52f are the second type gas transferring pipes II which are mounted on the top surface 22 of the respective tanks, for example, tanks 30b and 30d and the second type gas transferring pipes II are connected to the air pumps rather than direct connecting to the respective tank.

Each of the first type gas transferring pipes I has three portions, i.e., an upper portion 74, an intermediate portion 72 and a lower portion 70. The upper portions 74 of the first type gas transferring pipes I is positioned outside the tanks and has two ends 76 and 78 mounted on the respective two tanks connecting one to another. In this particular embodiment, the first end 76 mounted on the tank 30a and the second end 78 mounted on the tank 30b connect two tanks 30a, 30b together so that the gas is transferred through the upper portion 74 into the intermediate portion 72. Both the intermediate portion 72 and the lower portion 70 are located in each of the tanks 30. The intermediate portion 72 is formed substantially straight and extends vertically along the front surface 24 of the tank 30. The lower portion 70 connected to the intermediate portion are curved and substantially occupies the lower space 68 of the tanks 30. In some embodiments, the lower portion 70 of the first type gas transferring pipes I are horizontally curved, for example, in form of a closed M shape, so as to achieve the desired efficiency of releasing the gas bubbles into the liquid.

Figure 5:
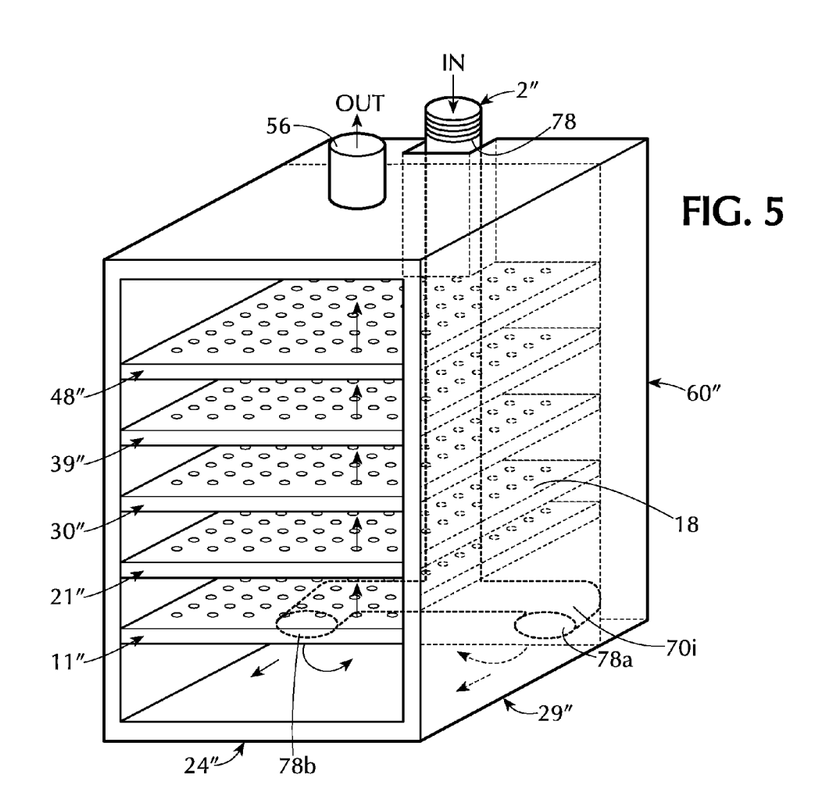
FIG. 5 is a schematically perspective view showing a layer filter system according to one or more embodiments of the gas filtration system.

The gas transferring pipe 52i is one of the first type gas transferring pipes and has the upper and intermediate portions 74, 72. The gas transferring pipe 52i is mounted on the top surface 24 of the tank 30f and connected to the tank 30g containing the layer filters 18 for purifying the gas via the upper portion 74. The difference between the gas transferring pipe 52i and other transferring pipes, for example, 52a, 52b, 52d, 52e, 52g, 52h, is that the lower portion 70i, i.e., a T-shape, with at least one exit 78 for releasing gases. In some embodiments, the lower portion 70i may have two exits 78a, 78b as shown in FIG. 5.

According to FIG. 3, a detailed process for filtration including water/wet filtration and dry fiber filtration is shown and illustrated below.

The first gas pump 14a forces the gases through the gas inlet 54 mounted on the top surface 22 of the first tank 30a into the first tank 30a. The gas inlet 54 is connected to the first gas transferring pipe 52a.

The gas is introduced from the gas inlet 54 and is then forced into the first gas transferring pipe 52a in the first tank 30a. Specifically, the gas is forced downwardly through the intermediate portion 72 of the first gas transferring pipe 52a to the lower portion 70 of the first gas transferring pipe 52a and further released into the lower space 68 of the first tank 30a.

In the embodiments of the invention, the lower portions 70 of the gas transferring pipes 52 include a plurality of small holes 40 for releasing the gases out of the pipes 52. Each hole 40 has a predetermined diameter, e.g., 3/16" for producing the desired gas/liquid interaction while not providing a flow resistance which will defeat the intended wet filtration.

When the gas is released through the holes 40, it naturally creates a bubble effect (viz., bubbles). This helps maximize the surface area of the gases caught in each bubble, thereby allowing the water to adequately interact with the gas. After the first round of filtration, the bubbles (gases) rise to the top surface of the liquid which top surface is defined by the liquid level 64 and further release the gas into the upper space 66 of the first tank 30a, and thereafter are forced into the second tank 30b.

The gas after the first round of filtration in the first tank 30a is forced into a second gas transferring pipe 52b mounted on the top surface 24 of the second tank 30b. The gas is forced downwardly via the intermediate portion 72 of the second gas transferring pipe 52b to a lower space 68 of the second water tank 30b. The gas is then sent into the lower portion 70 of the second gas transferring pipe 52b and released through the small holes 40. Similarly as the first round of filtration, since the gas is forced to be send out through the small holes 40, it naturally creates another bubble effect to maximize the surface area of the gas caught into each bubble thereby allow the liquid to fully interact with the gas and achieve the desired filtration. After two rounds of filtration, the bubbles (gases) rise to the top surface 64 of liquid so that the gas collects in the upper space 66 of the second tank 30b and thereafter is forced into the third tank 30c.

The filtered gas from the second tank 30b is then forced into a third gas transferring pipe 52c connected to the gas pump 14a. The gas is forced by the gas pump 14a through the fourth gas transferring pipe 52d into the third tank 30c.

The gas is forced by the gas pump 14a and also forced by the gas pump 14b into the fourth gas transferring pipe 52d mounted on the top surface 22 of the third tank 30c. The gas is forced downwardly via the intermediate portion 72 of the fourth gas transferring pipe 52d to the lower space 68 of the third tank 30c. The gases are then directed into the lower portion 70 of the fourth gas transferring pipe 52d and released through the small holes 40. The third tank 30c contains no liquid for gas filtration. The third tank 30c is used as a gas buffer which assists the first and second gas pump 14a, 14b to move the gas smoothly into the next filtration tank. The filtered gas in the third water tank 30c is then forced into the fourth tank 30d.

The gas after passing through the third tank 30c are forced into a fifth gas transferring pipe 52e mounted on the top surface 22 of the fourth tank 30d. The gas is forced downwardly via the intermediate portion 72 of the fifth gas transferring pipe 52e to the lower space 68 of the fourth tank 30d. The gas is then sent into the lower portion 70 of the fifth gas transferring pipe 52e and released through the small holes 40 to produce the aforementioned natural bubble effect. After three rounds of filtration, the bubbles (gases) rise to the top surface 64 of liquid and the gas is released into the upper space 66 of the fourth tank 30d whereafter the gas is gathered and is forced into the fifth tank 30e.

The gas from the fourth tank 30d is then forced into a sixth gas transferring pipe 52f connected to the gas pump 14b so that gases are then forced by the gas pumps 14a, 14b through a seventh gas transferring pipe 52g into the fifth tank 30e.

The gas is forced by the gas pumps 14a, 14b into a seventh gas transferring pipe 52g mounted on the top surface 22 of the fifth tank 30e. The gases are forced downwardly via the intermediate portion 72 of the fifth gas transferring pipe 52g to the lower space 68 of the fifth water tank 30e along the seventh gas transferring pipe 52g. And then the gas is sent into the lower portion 70 of the seventh gas transferring pipe 52g and released through the small holes 40. After four rounds of filtration, the bubbles (gases) rise to the top surface 64 of liquid and the gas is release into the upper space 66 of the fifth tank 30e whereafter it is forced into the sixth tank 30f.

The gas is forced into an eighth gas transferring pipe 52h mounted on the top surface 22 of the sixth tank 30f. The gas is pulled downwardly via the intermediate portion 72 of the eighth gas transferring pipe 52h to the lower space 68 of the sixth tank 30f along the lower portion 70 of the eighth gas transferring pipe 52h. The gas is then sent into the lower portion 70 of the eighth gas transferring pipe 52h and released through the small holes 40. After five rounds of filtration, the bubbles (gases) rise to the top surface 64 of water and further released into the upper space 66 of the sixth tank 30f and then forced into the seventh tank 30g.

At the fifth round filtration in the sixth tank 30f, in the particular embodiment, the gases have been completely wet filtered via water filtration.

The cleansed gas is forced into a ninth gas transferring pipe 52i mounted on the top surface 22 of the seventh tank 30g. In the embodiment as illustrated in FIG. 3, the seventh tank 30g serves as a final filter tank. The final filter tank 30g can have the same size as the other water tanks 30a, 30b, . . . 30h. The cleansed gas is forced downwardly via the intermediate portion 72 of the ninth gas transferring pipe 52*i* to a lower space 68*i* of the tank 30*g* through the ninth gas transferring pipe 52*i*. The ninth gas transferring pipe 52*i* includes the T-shaped lower portion 70*i* having two exits 78*a*, 78*b* for releasing gas into the lower space 68*i* of the gas tank 30*g*. The lower space 68*i* is defined by the layer filters 18. In the embodiment as illustrated in FIG. 3, the layer filters 18 divide the tank 30*g* into several spaces, and the gas is released from the exits 78*a*, 78*b* into the lower space 68*i*. The cleansed gas is forced through several, e.g., five layers 18 of filtration in a lower-upper direction.

Each layer filter 18 of filtration contains micro particle filters with activated carbon/charcoal in between. The activated carbon allows for smell neutralization/removal and micro particle filters are used as an added measure of filtration. After layers filtration, the cleansed gases are finally released into the atmosphere through a gas outlet 24 mounted on the top surface 24 of the tank 30*g*.

Since the wet filtering filters out the most contaminants of the gases through five rounds of filtration, the layer filters can be used for prolonged periods and replaced only every few months (for example).

Figure 4:
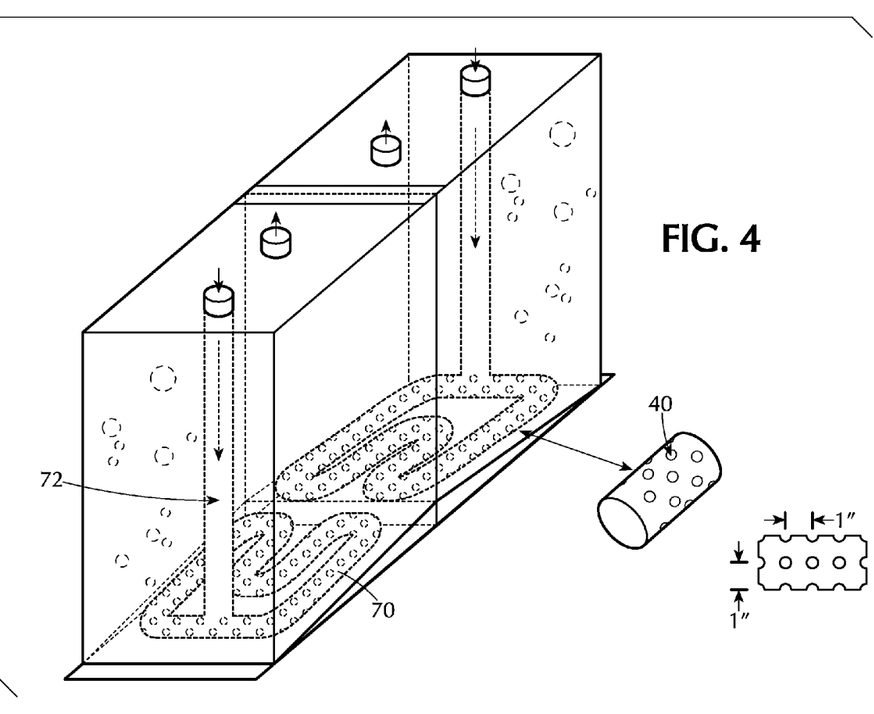
FIG. 4 is a perspective view schematically showing an example of two tanks connected to each other with pipes and showing the gas capture process of the gas filtration system.

FIG. 4 shows an example of two general tanks according to the embodiments described above and schematically showing the gas capture process of the gas filtration system 10.

FIG. 4 only shows the intermediate portion and the lower portion of the two gas transferring pipes 50 to illustrate the gas capture process simply. Basically, as stated above corresponding to FIG. 3, the gas is forced into the tank through the gas transferring pipes 50 and released out through the small holes 40. The bubbles formed are outputted through the adjacent gas transferring pipe or a pipe outlet (shown in FIG. 4). The small holes 40 are evenly distributed at the lower portion 25 of the first and second types of the gas transferring pipes 50. More specifically, the holes in this particular embodiment are spaced from one to another at a predetermined distance, 1".

FIG. 5 shows an inner frame of the gas tank according to the present invention. The gas tank 30*g* has the same three dimensions as the other water tanks. The gas transferring pipe 52*i* is located inside of the gas tank 30*g* for transferring gases into the lower portion of the gas tank 30*g*. The gas transferring pipe 52*i* is positioned through all layer filters and the lower portion of the pipe 52*i* is located under the lowermost layer filter therefore the gases are filtered and released out of the gas tank 30*g* from the lowermost layer filter to the uppermost layer filter.

Each layer filter 18 is positioned in the gas tank 30*g* and spaced from one to another at a predetermined distance, e.g. 9". For example, a first layer is spaced from a bottom surface of the gas tank 30*g* is 48"; a second layer is spaced from the bottom surface of the gas tank 30*g* is 39"; a third layer is spaced from the bottom surface of the gas tank 30*g* is 30"; a fourth layer is spaced from the bottom surface of the gas tank 30*g* is 21" and a fifth layer is spaced from the bottom surface of the gas tank 30*g* is 11".

After the process of liquid filtration and layer filtration, the liquid used for filtration is then sent back to the tanks 30 for next filtration by the liquid transferring pipes 12. The liquid, for example, water used as a filtrate can be easily replaced with clean water so as to allow the gas filtration system to be used continuously with an endless lifespan.

It should also be noted that used water may be collected from the gas filtration system when it is necessary to be changed (for example). According to an experiment for testing the collected used water on a grass patch, there was an absence of any notable deterioration of the grass. The collected waste water can be simply sprinkled, for example, on grass or into septic tank disposal system or the like.

As noted previously, the layer filters, for example, the micro particle filter can also be simply replaced every few months, due to the fact that micro particle filters used in the last step of the entire filtering process, and will last for prolonged period since the liquid has filtered out most of the harmful contaminates in prior to reaching the dry filtering stage.

In order to achieve the desired result, it should be noted that a combination of the predetermined amounts of water in each tanks is required. Further, the size of each the hole 70 in such a desired combination is 3/16" as presented above.

It will be readily seen by one of skill in the art that the present invention fulfils all of the objects set forth above. After reading the foregoing specification, the person of skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of a gas filtration system for filtrating gases, comprising:
    passing the gases through pipes into multiple tanks, respectively, each of the tanks contains a predetermined level of water for purifying the gases;
    passing the gases through a plurality of circular holes distributed along closed M-shaped pipes into the water in form of bubbles, wherein the gases contained in the bubbles rise to a top surface of the water level;
    passing the gases upwardly from each of the tanks and then passing the gases downwardly into the adjacent tank through the respective pipe; and
    releasing the gases from the tanks.

2. The method according to claim 1, wherein said tanks includes a dry tank free of water to relieve pressures and allows the gases to move more smoothly into an adjacent tank.

3. The method according to claim 1, further comprising, before releasing the gases, passing the gases into a layer filtering system having a plurality of dry filters.

4. The method according to claim 1, wherein said pipes for transferring the gases include:
    first gas transferring pipes mounted on a top surface of the respective tanks and extending into the respective adjacent tank; and
    second gas transferring pipes mounted on the top surface of said respective tanks for transferring the gases and connected to a pump for forcing the gases in or out of the tanks.

5. The method according to claim 4, wherein each of said first gas transferring pipes includes:
    a lower portion extending in the lower space of the tanks, having a closed M shape, and having the circular holes formed along a length of the pipes for releasing the gases; and
    an upper portion extending contiguous to the lower portion.

6. The method according to claim 4, wherein the predetermined level of the water is determined based on a power of the pump.

7. The method according to claim 1, wherein the tanks contain different level of the water for purifying the gases.

8. The method according to claim 1, wherein the gases are smokes.

9. The method according to claim 4, wherein the circular holes are aligned and spaced to each other around the first gas transferring pipes in a predetermined distance.

10. The method according to claim 9, wherein the diameter of each said circular hole is a predetermined diameter for producing an interaction between the water and the gases while not providing a flow resistance which may defeat a wet filtration ability.

11. The method according to claim 10, wherein the predetermined distance is approximately one inch, and the predetermined diameter is approximately 3/16 of one inch.

12. The method according to claim 2, wherein the dry tank is positioned between a pump and a postpositioned tank containing water.

* * * * *